Sept. 29, 1953 J. C. MATHIESEN 2,653,481
TEMPERATURE-COMPENSATED GYROSCOPE
Filed Feb. 19, 1952
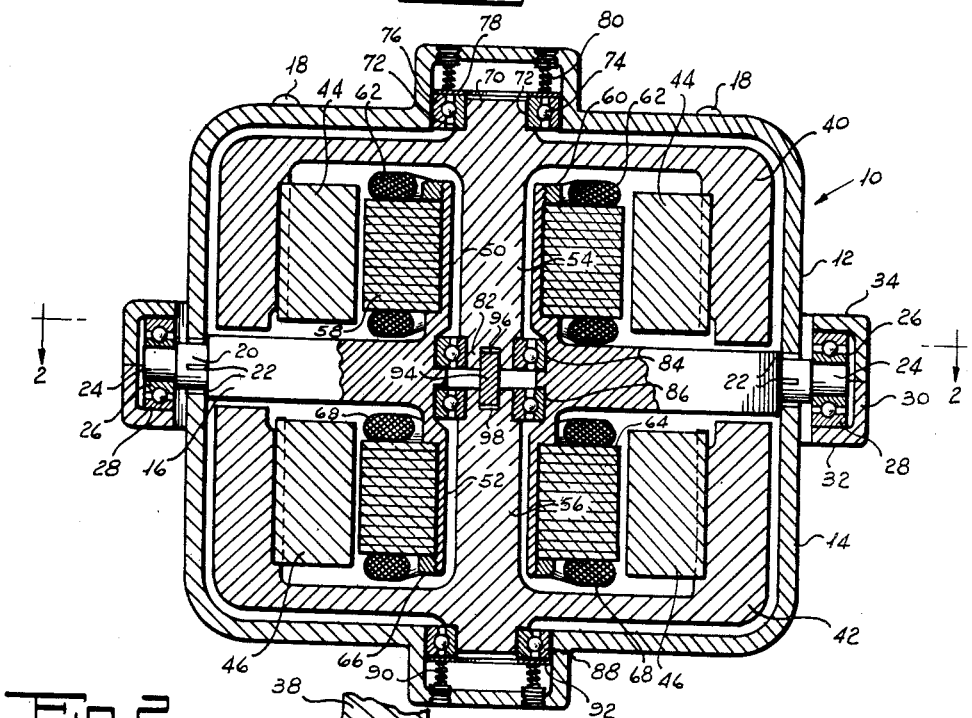
INVENTOR.
JAMES C. MATHIESEN
BY
Henry L. Shenier
ATTORNEY Patented Sept. 29, 1953

2,653,481

UNITED STATES PATENT OFFICE 2,653,481

TEMPERATURE-COMPENSATED GYROSCOPE

James C. Mathiesen, Pleasantville, N. Y., assignor to The Norden Laboratories Corporation, White Plains, N. Y., a corporation of Connecticut Application February 19, 1952, Serial No. 272,389

4 Claims. (Cl. 74—5.37)

My invention relates to temperature-compensated gyroscopes and more particularly to a gyroscope which will automatically compensate itself for unbalancing forces which would normally be introduced by reason of the expansion and contraction of metal parts due to temperature changes.

Gyroscopes are frequently used for many control devices to furnish reference planes. For these purposes the gyroscope rotor must be carefully balanced to prevent precessional drifts from developing due to unbalance of the rotor with respect to the axes around which the gyroscope is free to pivot.

It has been found that if a gyroscope is balanced at one temperature, a change in temperature will frequently result in the production of unbalancing forces due to contraction and expansion inherent in the metal of which the rotor is made and the manner in which the rotor is mounted. Many attempts have been made by the art to eliminate this defect.

One object of my invention is to provide a gyroscope which will automatically compensate itself for the expansion and contraction of the rotor resulting from temperature changes.

Another object of my invention is to provide a gyroscope structure which when balanced at one temperature will remain in balance through a wide temperature range automatically compensating for expansion and contraction of metal parts.

Other and further objects of my invention will appear from the following description:

In general, my invention contemplates constructing the gyroscope rotor and stator of two equal masses and mounting the rotor and stator symmetrically about a plane normal to the spin axis. My construction is such that the expansion and contraction of the parts will be equal and opposite about this plane such that the gyroscope will remain always balanced. Advantageously I provide each of the symmetrical rotor elements with floating bearings adapted to accommodate expansion and contraction of the rotor assembly.

In the accompanying drawings, which form part of the instant specification and which are to be read in conjunction therewith and in which like reference numerals are used to indicate like parts in the various views:

Figure 1 is a sectional elevation of a gyroscope assembly containing one embodiment of my invention.

Figure 2 is a sectional view taken along the line 2—2 of Figure 1, with parts broken away.

More particularly referring now to the drawings, a gyroscope housing indicated generally by the reference numeral 10 is formed by two identical cup-shaped members 12 and 14 and a central plate 16. The cup-shaped members are adapted to be clamped together by means of screws 18. The plate 16 is formed with a pair of trunnions 20 provided with splines 22 adapted to coact with the housing members 10 and 14 to provide a rigid framework for supporting the gyro rotor. For purposes of convenience I will describe my gyroscope as one in which the spin axis is vertical, though it is to be understood that my invention is applicable to a gyroscope having a spin axis extending along any direction. The trunnions 20 are formed with reduced end portions 24 which are carried by the inner races 26 of a pair of ball bearings. The outer races 28 of the ball bearings are supported by a gimbal ring 30. The gyroscope housing, it will be observed, is pivoted along a horizontal plane normal to the spin axis. The axis of the trunnions 20 lies along the horizontal center line of plate 16. The gimbal ring 30 is made with a lower part 32 and an upper symmetrical part 34 adapted to be clamped together by vertical screws 36, as can readily be seen by reference to Figure 2. The gimbal ring 32 is in turn formed with a pair of trunnions 38 lying in a horizontal plane but extending at right angles to the axis around which bearings 26 are positioned. These trunnions are mounted in suitable bearings carried by any desired support (not shown). The gyroscope rotor, therefore, is thus mounted with three degrees of freedom. The gyroscope rotor, per se, comprises an upper section 40 and a lower section 42, both of which are identical as nearly as they can be made. The rotor components may be formed of a heavy metal such as tungsten so that the rotor will have a high moment of inertia. The rotor 40 carries a plurality of blades 44 forming the squirrel cage of an induction motor. The lower rotor 42 carries a plurality of blades 46 likewise forming the squirrel cage of an induction motor. The central plate 16 is formed with an upper tubular portion 50 and a lower tubular portion 52 through which the shaft 54 of the upper rotor and the shaft 56 of the lower rotor, respectively, extend. Laminated core elements 58 are lodged around the upper tube 50 and clamped in position by a nut 60. The stator winding 62 is disposed about the core laminations 58. Similarly, core laminations 64 are disposed about the lower tube 52 and clamped in position by a nut 66. The winding 68 for the field of the lower rotor is disposed about the core laminations 64. Suitable three-phase alternating current is fed to the windings 62 and 68, as is well known in the art, to produce a rotating magnetic field which, coacting with the squirrel cage blades 44 and 46, drives the upper and lower rotors. The upper shaft 54 is provided with a reduced end portion 70 carried by the inner race 72 of a ball bearing which is provided with balls 74 and an outer race 76. An annular plate 78 contacts the bearing assembly and is urged downwardly by a plurality of springs 80. The lower portion of the shaft 54 is provided with a reduced end portion 82 which is carried by a suitable ball bearing 84 in the central plate 16. The upper portion of lower shaft 56 is carried by a ball bearing 86 lodged in the central plate 16. The bearing seats for bearings 84 and 86 in central plate 16 are symmetrically disposed, as can readily be seen by reference to Figure 1. The lower portion of lower shaft 56 is supported by a ball bearing 88 similar to the upper ball bearing assembly. The ball bearing 88 is urged upwardly by a plurality of springs 90 acting through an annular disk 92. A key 94 has its upper portion lodged in a slot 96 formed in the lower end of shaft 54. The lower end of key 94 is lodged in a slot 98 formed in the upper portion of the shaft 56. The key constrains the upper and lower shafts to rotate together. The upper springs 80 constrain the upper bearing to move downwardly, thus firmly maintaining the shaft against the bearing 84. Similarly, the springs 90 bias the ball bearing 88 to constrain the shaft 56 to be seated firmly in its upper bearing 86. In this manner the bearings 84 and 86 are fixedly positioned in their seats in central plate 16. As the shafts 54 and 56 expand and contract due to temperature changes, the respective outer bearings will move against the action of the respective springs 80 and 90. It will be observed, however, that this movement is symmetrical to the horizontal center line of the central plate 16 so that no eccentric distribution of the rotor weight is occasioned by any expansion or contraction due to temperature changes, and accordingly no precessional errors are introduced from this cause. It is to be understood, of course, that expansion and contraction of the rotors themselves are likewise balanced. Any change in dimensions of the upper rotor due to temperature changes will be equal and opposite to the change in dimensions produced from temperature changes in the lower rotor. This is true, too, of the field laminations and the central tubes 50 and 52. Accordingly, my gyroscope assembly being balanced for one temperature will remain balanced for all temperatures, since a change in weight distribution of the upper rotor and its associated parts will be compensated for by an equal and opposite change in the weight distribution of the lower rotor.

It will be seen that I have accomplished the objects of my invention. I have provided a gyroscope which will automatically compensate itself for expansion and contraction of the rotor, the housing and associated parts from temperature changes and thus provide a gyroscope structure which, when balanced at one temperature, will remain balanced through a wide temperature range.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A gyroscope having a housing, a rotor mounted in the housing for rotation about a spin axis, means for mounting the housing for pivotal movement about a tilt axis extending at right angles to the spin axis, said rotor being formed with two symmetrical parts of equal mass each having its own rotor shaft, a bearing support member carried by the housing symmetrical with a plane passing through the tilt axis at right angles with the spin axis, a first bearing carried by the support on one side of said plane, a second bearing carried by the support on the other side of the plane symmetrical to the first bearing, a third bearing carried by the housing on one side of said plane, a fourth bearing carried by the housing on the other side of said plane symmetrical with the third bearing, said bearings being disposed coaxially with the spin axis, the shaft of the first rotor part being mounted in the first and third bearings, the shaft of the second rotor part being mounted in the second and fourth bearings, means for fixedly positioning one symmetrically carried pair of bearings, means for floatingly positioning the other symmetrically carried pair of bearings for movement along the spin axis, means for biasing each floating bearing toward its companion fixed bearing and means for connecting the rotor shafts to each other for rotation together.

2. A gyroscope as in claim 1 in which the fixed bearings are carried by said support member.

3. A gyroscope as in claim 1 in which each of said rotor parts carries squirrel cage induction motor elements and a pair of symmetrical field windings carried by said support member on each side of said plane.

4. A gyroscope having a compound rotor formed of two equal masses disposed symmetrically about a plane extending at right angles to the spin axis, each of the rotor components having a pair of bearings for independently rotatably supporting the same, said bearings being respectively symmetrically disposed, means for fixedly positioning one symmetrically disposed pair of bearings, and means for floatingly positioning the other symmetrically disposed pair of bearings for movement along the spin axis, means for biasing each floating bearing towards its respective fixed bearing, and means for constraining the rotor components to rotate together.

JAMES C. MATHIESEN.

References Cited in the file of this patent

UNITED STATES PATENTS

| Number | Name | Date |
|---|---|---|
| 1,136,666 | Gardner | Apr. 20, 1915 |
| 1,250,592 | Klahn | Dec. 18, 1917 |
| 2,345,915 | Carlson | Apr. 4, 1944 |

FOREIGN PATENTS

| Number | Country | Date |
|---|---|---|
| 6,359 of 1905 | Great Britain | Mar. 1, 1906 |